(12) United States Patent
Hartwich et al.

(10) Patent No.: US 8,321,612 B2
(45) Date of Patent: Nov. 27, 2012

(54) METHOD AND DEVICE FOR SYNCHRONIZING TWO BUS SYSTEMS BY TRANSMISSION OF A TIME ASSOCIATED TRIGGER SIGNAL FROM ONE SYSTEM TO ANOTHER

(75) Inventors: Florian Hartwich, Reutlingen (DE); Jan Taube, Markgröningen (DE)

(73) Assignee: Robert Bosch GmbH, Stuttgart (DE)

( * ) Notice: Subject to any disclaimer, the term of this patent is extended or adjusted under 35 U.S.C. 154(b) by 688 days.

(21) Appl. No.: 11/918,998

(22) PCT Filed: Apr. 13, 2006

(86) PCT No.: PCT/EP2006/061575
§ 371 (c)(1),
(2), (4) Date: Nov. 6, 2009

(87) PCT Pub. No.: WO2006/111499
PCT Pub. Date: Oct. 26, 2006

(65) Prior Publication Data
US 2010/0049891 A1    Feb. 25, 2010

(30) Foreign Application Priority Data
Apr. 22, 2005 (DE) .......................... 10 2005 018 837

(51) Int. Cl.
*G06F 13/00* (2006.01)
(52) U.S. Cl. ....................................................... 710/110
(58) Field of Classification Search .......... 710/300–315, 710/104–125, 1–2, 15–16, 58–61
See application file for complete search history.

(56) References Cited

U.S. PATENT DOCUMENTS

| | | | | |
|---|---|---|---|---|
| 6,118,835 | A * | 9/2000 | Barakat et al. | 375/372 |
| 7,107,473 | B2 * | 9/2006 | Fuehrer et al. | 713/400 |
| 7,284,142 | B2 * | 10/2007 | Noha et al. | 713/502 |
| 7,472,216 | B2 * | 12/2008 | Fredriksson et al. | 710/305 |
| 7,478,234 | B2 * | 1/2009 | Fredriksson | 713/151 |
| 7,594,054 | B2 * | 9/2009 | Joos et al. | 710/305 |
| 7,676,727 | B2 * | 3/2010 | Harter et al. | 714/763 |
| 7,711,880 | B2 * | 5/2010 | Fredriksson | 710/117 |
| 7,801,131 | B2 * | 9/2010 | Horst et al. | 370/389 |
| 7,920,587 | B2 * | 4/2011 | Fuehrer | 370/442 |
| 7,995,620 | B2 * | 8/2011 | Schirmer et al. | 370/503 |

(Continued)

FOREIGN PATENT DOCUMENTS
EP    0 942 556    9/1999

(Continued)

*Primary Examiner* — Raymond Phan
(74) *Attorney, Agent, or Firm* — Kenyon & Kenyon LLP (57) ABSTRACT

A device for synchronizing at least two bus systems, having a first communications module for a first bus system and a second communications module for a second bus system, wherein in the first communications module first trigger information is present by which a trigger signal is triggered in the first bus system, characterized in that the device is configured in such a manner that the first and second communications modules are connected to each other and the first trigger information is transmitted to the second communications module, and the second communications module is configured in such a manner that a time information value is determined from the first trigger information and that time information value is compared with a second time mark of the second bus system, a time difference being determined and the next reference message being triggered in the second bus system in dependence upon the second time mark and the time difference.

15 Claims, 4 Drawing Sheets

U.S. PATENT DOCUMENTS

| | | | |
|---|---|---|---|
| 2003/0158983 A1* | 8/2003 | Dalakuras et al. | 710/107 |
| 2003/0184158 A1* | 10/2003 | Fuehrer | 307/10.1 |
| 2004/0193932 A1* | 9/2004 | Fuehrer et al. | 713/400 |
| 2005/0013394 A1* | 1/2005 | Rausch et al. | 375/356 |

FOREIGN PATENT DOCUMENTS

| | | |
|---|---|---|
| EP | 1 047 213 | 10/2000 |
| JP | 2001-308868 | 11/2001 |
| WO | WO 2005/013523 | 2/2005 |

* cited by examiner

METHOD AND DEVICE FOR SYNCHRONIZING TWO BUS SYSTEMS BY TRANSMISSION OF A TIME ASSOCIATED TRIGGER SIGNAL FROM ONE SYSTEM TO ANOTHER

FIELD OF THE INVENTION

The present invention relates to a method and a device for synchronizing two bus systems and to a corresponding arrangement composed of two bus systems in which time control is effected by reference messages.

BACKGROUND INFORMATION

A reference message of that kind for producing basic cycles in the context of time-controlled communication on a bus system is used, for example, in the case of FlexRay or also in the case of TTCAN. Such bus systems are necessary, since the networking of control units, sensors and actuators has increased dramatically in recent years not only in modern motor vehicle manufacturing and in engineering, especially in the machine tool sector, but also in automation technology. It is possible in these cases to obtain synergetic effects by distributing functions among several control units. Communication between various stations of such distributed systems is increasingly taking place, therefore, via a bus system or via a plurality of coupled bus systems. The communications traffic on the bus systems, access and receiving mechanisms, and error handling are governed by a protocol. One protocol, which is established, for example, in the automotive sector, is the CAN (controller area network) protocol. This is an event-triggered protocol, that is to say, protocol activities such as transmission of a message are initiated by events that originate outside the communications system, that is, outside the bus system. The bus system involved in this case is an event-triggered bus system that may, in particular, also be triggered by external events. As a result, the CAN protocol is very flexible and thus it is possible for further stations and messages to be added without any problem.

An alternative approach to event-triggered, spontaneous communication is the purely time-triggered approach. All communication activities on the bus are strictly periodic. Protocol activities such as the transmission of a message are triggered only by the passage of a time applicable to the entire bus system. Access to the medium is based on the allocation of time ranges in which a transmitting station has an exclusive transmission right. The protocol is comparatively inflexible, and adding new nodes is possible only if the corresponding time ranges were left free beforehand. This circumstance forces the order of the messages to be set before operation is started. In this case, therefore, a schedule is drawn up which has to meet the requirements of the messages with regard to repetition-rate, redundancy, deadlines and so on. At the same time, the positioning of the messages within the transmission periods must be coordinated with the applications producing the contents of the messages so that the latencies between the application and the instant of transmission are kept to a minimum. If that coordination is not carried out, the advantage of time-triggered transmission—minimal latency jitters when the messages are being sent over the bus—would be destroyed. In the case of the purely time-triggered approach, therefore, high demands are made on the planning pool.

The approach using a time-triggered controller area network, the so-called TTCAN, that is presented in the 2003 ISO 11898-4 Standard-Draft (ISO/TC22/SC3) satisfies the requirements outlined above for time-triggered communication and satisfies the requirements for a certain degree of flexibility. The TTCAN fulfills those requirements by the structuring of communication rounds, so-called basic cycles, by sending a reference message using the timer or the so-called time master. Those basic cycles are then divided in turn into so-called exclusive time windows for periodic messages of specific communications stations and into so-called arbitrating time windows for spontaneous messages of a plurality of communications stations.

The following remarks are therefore based on the synchronization not only of at least two TTCAN bus systems or networks but also of other, comparable bus systems already mentioned, for example FlexRay, the intention also being to ensure synchronization of mixed, that is to say, different, bus systems.

In such systems, the communication round is determined, as already mentioned, by a basic cycle, that is, by a timer or a first station that repeatedly transmits a reference message over the bus system at least one specifiable time interval, the reference message being triggered by time trigger information when time information reaches a time mark associated with the trigger information. The time information in the TTCAN is, for example, the cycle time, which is defined by the local time, that is, the local clock of the timer or time master, and by the reference message. If a given time mark is reached by that time information, that is, the cycle time of the TTCAN, then whenever that time mark is reached a trigger will be activated in order to start the respective reference message. In that manner, the time master in the bus system specifies the time for the bus system in accordance with the basic cycle. If a shifting of such a basic cycle is to take place, the TTCAN protocol, for example, offers the possibility of shifting the communication by setting a bit in such a reference message. Such shifting is particularly necessary in order, for example, to synchronize the TTCAN bus with the phase of a time base, especially an external time base, for example if the Event-Synchronized-Time-Triggered-Communication-Option is used in the TTCAN.

That is to say, time-triggered networks or bus systems like the TTCAN just mentioned or also FlexRay offer the possibility in most cases of synchronizing the communication with the phase of an external time base, such as, for example, also that of a further time-triggered network or bus system. The commonest method hitherto, in which, however, no mixed synchronization, that is to say synchronization of various different bus systems, is carried out, is a method that requires several actions of the host controller. Firstly, the host has to communicate to all nodes or stations, by setting corresponding provided bit/bit fields in a reference message or by sending a defined message, that after completion of the communication cycle a time interval, a so-called time gap, will be inserted. The host CPU then has to wait until the time gap has begun. The next reference message is then started in synchronized manner by activating the time trigger.

A disadvantage with such a method, however, is that intervention of the host controller or processor always takes place, and therefore, in the case of synchronizing a plurality of networks or bus systems, a high load is placed on at least one station processor and a certain dependence upon software latencies arises.

SUMMARY

Example embodiments of the present invention provide a method for synchronizing a plurality of autonomous protocol controllers as communications modules, and hence the bus systems associated therewith, with a common time base, without interventions of a station processor being necessary. That is to say, synchronization of the bus systems is to be performed without direct supervision by the processor used and independently of software latencies.

In the device, a first communications module is provided for a first bus system and a second communications module is provided for a second bus system and first trigger information is present by which a trigger signal is triggered in the first communications module of the first bus system, the first and second communications modules advantageously being connected to each other so that the first trigger information is transmitted to the second communications module and a time information value is determined from the first trigger information and that time information value is compared with a second time mark of the second bus system, a time difference being determined and the next reference message in the second bus system being triggered in dependence upon the second time mark and the time difference.

This makes possible a general method and device for synchronizing a plurality of autonomous protocol controllers, or communications modules as they are also referred to here, with a common time base of a first bus system, without interventions of a processor, host or station being required. That is to say, the synchronization is performed without direct supervision by the station processor or host processor used and thus also independently of software latencies. That is to say, in networked control units or control unit systems connecting a plurality of independent time-triggered bus systems to one another in automation technology and automotive engineering or also in other sectors, at least two bus systems or networks having a common time base, in particular a common global time, are advantageously used to avoid data inconsistencies or the transmission of obsolete data. In that manner, it is possible for interrupts, that is, interruption requests, to be generated also simultaneously or for tasks of a plurality of stations of separate and independent bus systems or networks to be performed also simultaneously. The method furthermore permits far more accurate adjustment of the time base by automatic correction and synchronization.

Advantageously, the first communications module corresponds to a time master of the first bus system and is configured in such a manner that it transmits the trigger signal repeatedly at a predefinable time interval, triggered by the first trigger information when first time information reaches a first time mark associated with the first trigger information.

For that purpose there is advantageously provided a first memory area, especially a register in the second communications module, in which the second time information value, which is obtained in dependence upon the trigger information, is stored. A second memory area is also provided, especially also in the form of a register, in which the second time mark of the second bus system is stored. Furthermore, a third memory area is advantageously provided, especially also in the form of a register, in which the time difference obtained from the time information value and the time mark is stored.

A large number of configurations is possible here as regards the allocation of time master functionality and slave functionality based on the communications modules. In one embodiment, it is advantageous, for example, for the second communications module to correspond to a time master of the second bus system and to be configured in such a manner that it triggers the next reference message in the second bus system when second time information attains the sum of the second time mark and the time difference. Thus, this is to be understood in this context as meaning that depending upon whether the time difference is positive or negative, in other words whether a lengthening or shortening takes place, the term "sum" also includes calculation of the difference in the case of negative time difference. This applies moreover to the other remarks in the present Application. The communications module of the first bus system may, on the other hand, correspond to a time master, a potential time master or a time slave.

In a second embodiment, it is provided that the second communications module corresponds to a slave in the second bus system, that is to say, does not represent a time master, and is configured in such a manner that it transmits second trigger information to a third communications module, which in this case is the time master of the second bus system. Advantageously, the second communications module in the second network dispatches a pre-defined message that contains the corresponding time information, the time difference, to that third communications module, which is the time master of the second bus system.

In the case of the device, the first and second communications modules are advantageously connected via a direct connection path in such a manner that the already mentioned first trigger information is written directly into a register of the second communications module. That direct connection is advantageously in the form of a point-to-point connection and, particularly expediently, in the form of a serial bit line. That trigger line, that is, the connection between the first and second communications modules, may on the one hand be in the form of a cascade ring, that is, a ring-shaped connection, or also, particularly in the case of a plurality of communications modules, may be star-shaped in the form of a plurality of point-to-point connections.

Likewise advantageous is an arrangement composed of at least two bus systems, with a device for synchronizing the at least two bus systems as described, having a first communications module on a first bus system and a second communications module on a second bus system, wherein in the first communications module first trigger information is present by which a trigger signal is triggered in the first bus system, wherein the first and second communications modules are connected to each other in such a manner that the first trigger information is transmitted to the second communications module, and the second communications module is configured in such a manner that a time information value is determined from the first trigger information and that time information value is compared with a second time mark of the second bus system, a time difference being determined and the next reference message in the second bus system being triggered in dependence upon the second time mark and the time difference.

Equally advantageous is a method for synchronizing at least two bus systems, wherein in a first bus system a trigger signal is triggered by first trigger information and the first trigger information is transmitted to the second bus system and a time information value is determined from the first trigger information and that time information value is compared with a second time mark of the second bus system, a time difference being determined and the next reference message in the second bus system being triggered in dependence upon the second time mark and the time difference.

Advantageously, in that method, the trigger signal in the first bus system is transmitted repeatedly at a prefinable time interval, triggered by the first trigger information when first time information reaches a first time mark associated with the first trigger information.

It is furthermore advantageous that the next reference message of the second bus system is triggered when second time information attains the sum of the second time mark and the time difference determined from the trigger information.

Further advantages and advantageous embodiments will be apparent from the description and from the features of the figures.

Example embodiments of the present invention are described in detail below with reference to the Figures shown in the drawings.

DETAILED DESCRIPTION

The present invention will now be described in detail below with reference to exemplary embodiments.

Figure 1:
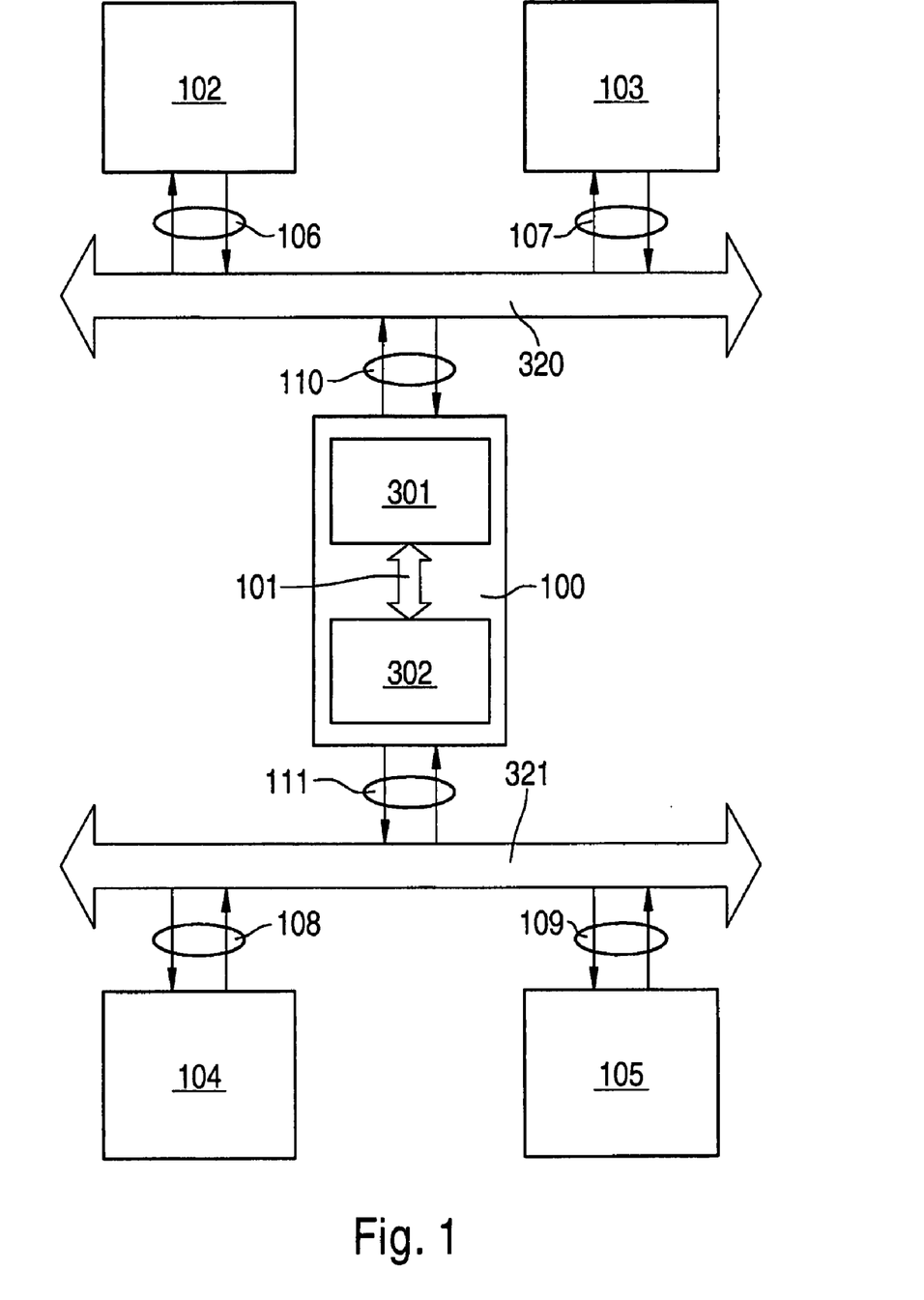
FIG. 1 shows an arrangement composed of two bus systems and a device as a gateway between the bus systems.

FIG. 1 shows an arrangement composed of two bus systems 320 and 321 and a device forming a gateway between the bus systems. Bus system 320 has stations or nodes 102 and 103 which are linked to the bus system via bidirectional connections 106 and 107, respectively. Also illustrated is a second bus system 321, which has stations 104 and 105 and is connected to those stations via bidirectional interfaces 108 and 109.

100 denotes a gateway station through which bus systems 320 and 321 are connected to each other. This is done with bus system 320 via bidirectional interface 110 and with bus system 321 via bidirectional interface 111. 301 and 302 denote communications modules, first communications module 301 being coupled to bus system 320, that is to say being used for that bus system, and second communications module 302 being coupled to bus system 321 and thus being responsible for that bus system. Via a schematic connection 101, which may have both serial connections and/or parallel connections, the two communications modules 301 and 302 are directly connected to each other in gateway station 100.

As already explained in the introductory part of the description, there are a great many different transmission technologies and hence types of bus system. Accordingly, a plurality of bus systems of the same kind or of different kinds have to be connected to one another. A bus interface unit of this kind, that is to say, a so-called gateway, is used for that purpose.

Such a gateway is accordingly an interface unit between different bus systems that may be of the same kind or of different kinds, such a gateway forwarding information, such as, for example, messages, or as is the case according to the present invention, also trigger information, from one bus system to one or more other bus systems. If that exchange of information were to be performed via the processor interface, that is, the processor of the relevant station, that processor would be placed under a high load by that data exchange in addition to the information that is to be transmitted to the station itself, which in combination with the resulting transmission structure would result in a possibly relatively low data transfer rate. In order to avoid that loading of the processor, the illustrated arrangement according to the present invention and also the corresponding method and the device included in the arrangement are used as the basis for achieving the aforementioned advantages.

Several system configurations are possible in accordance with the present invention, for example a configuration with regard to 1, where for automatic synchronization a time master is used which controls the global time of its bus system or network, specifically by outputting the corresponding reference messages, for example in this case communications module 302, while the first communications controller, in this case, for example, communications module 301 of gateway station 100, may be in the form of a time master or in the form of a slave and assumes the function of the gateway master or master network. Second communications module 302 and hence second bus system 321 synchronizes itself with first bus system 320 and adopts its global time.

In a second configuration, the station of the bus system with which at least one further bus system is to synchronize itself, in this case, therefore, communications module 301, may be used as a time master or as a slave. Second communications module 302 is likewise configured as a slave in this structure in accordance with the second configuration. In order to set the global time for the bus system, in this case, therefore, bus system 321, a determined time deviation must be communicated to the time master of the second bus system, that is, to a third communications station or communications module on bus system 321, by sending a corresponding message. That is to say, therefore, the information in the case of a slave configuration of module 302 is then merely passed on to the actual time master of bus system 321 and the latter then begins the following communication cycle, that is, especially the basic cycle, with an updated time mark by outputting the reference message for bus 321.

That is to say, therefore, communications modules 301 and 302 may, on the one hand, each be in the form of the time master of the corresponding bus system 320 and 321, respectively, or, as described in the configurations, may merely have slave functions and receive the information from the actual time master of the relevant bus system or pass it on to that time master.

Figure 2:
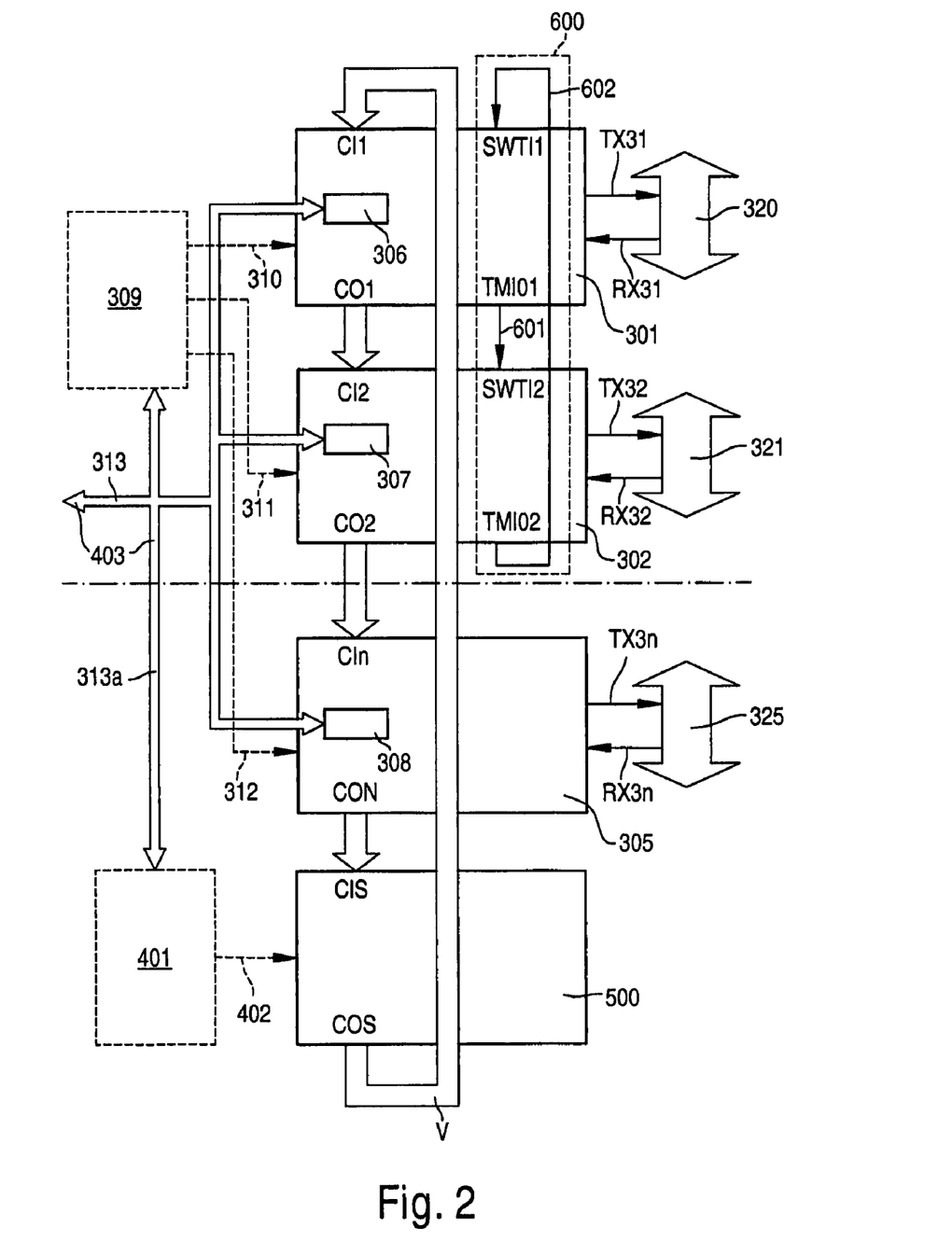
FIG. 2 shows a construction according to the present invention of the gateway device between the bus systems.

FIG. 2 shows such a gateway module or gateway device in more detail, in particular also supplemented, for example, by non-time-triggered bus systems and the corresponding communications modules and by a further optional module for controlling connections between the communications modules, which connections are shown by way of example in FIG. 1 as a schematic connection designated 101.

Communications modules 301 and 302, for example, represent therein modules of time-triggered bus systems. 305, for example, represents a communications module for a non-time-triggered system, such as, for example, for a normal CAN bus. The communications modules for the time-triggered bus systems are separated therein from the communications modules for the non-time-triggered bus systems by a dot-dash line. This illustrative gateway shown in FIG. 2 accordingly contains communications modules for time-triggered bus systems as well as communications modules for non-time-triggered bus systems, which, however, is actually to be understood as being merely illustrative, and therefore it is also possible according to the present invention to conceive of a gateway arrangement corresponding to FIG. 1 which contains only communications modules for time-triggered bus system since only time-triggered bus systems are connected (above the dot-dash line shown in FIG. 2). Each of the communications modules in FIG. 2 has a transmitting output (TX31, TX32 to TX3$n$, where n is a natural number) and a receiving input (RX31, RX32 to RX3$n$, with n being here also a natural number) for connection to a corresponding bus system 320, 321 and 325. In addition, 500 denotes a data integration unit DIU.

All the communications modules and data integration unit 500 are connected via transmission path V which connects those communications modules and the DIU in a ring. This creates a cascaded connection V which makes possible rapid and direct forwarding and communication of the communications modules in the gateway. For that purpose, these communications modules are connected by a cascaded output to a cascaded input via transmission path V. Thus, communications module 301 is connected via its cascade output (CO1, cascade output 1) to communications module 302 via the latter's input CI2 (cascade input 2). Similarly, block 302 is connected to block 305 via CO2 via CIn and 305 to 500 via CON to CIS. It is just as conceivable, however, to have a star connection or the like for this transmission path V. That is to say, the data transfer, that is, the transmission of data and/or message or information between the communications modules in the gateway, normally requires a large number of read and write operations which normally have to be handled by the host processor. For that purpose, CPU bus 403, which connects host CPU, not shown here, to communications modules 301, 302 and 305, is normally used. This, however, would severely load the host CPU, that is to say, the station, and thus would slow down the transmission. In order to improve this, this cascaded transmission path V is provided here, so that rapid information transmission between the communications modules is possible without loading the host. That is to say, a second data path, in this case V, which connects the communications modules in the gateway, is provided solely for data transmission. In that manner it is then possible for specifiable data and/or messages of the first data path, that is, of CPU bus 403, to be passed directly over the additional, second data path, that is, V, without loading the host CPU according to the normal data path. The control of that second data path, that is to say, on the one hand, the transmission or passing of the data and/or message via the second data path V and, in particular, the selection or specifying of the specifiable data and/or messages via that transmission path V, is effected by a control unit 309 which is especially in the form of a finite state machine (FSM). That control unit 309, especially in the form of a finite state machine, may on the one hand be accommodated in a communications module itself or may be associated with it and located outside of it. In particular, that control unit may, in one embodiment, be in the station, that is, in the host, and not in the communications module. Using that second, additional data path, transmission path V, it is then advantageously possible for a plurality of communications modules to be interconnected, especially in a cascaded manner, to form a gateway. Via outputs 310, 311 and 312 gateway finite state machine 309 then controls the transmission over the second transmission path V in which, on the one hand, the data and messages that are to be transmitted between the communications modules may thus be stipulated especially at bit level, and in which, on the other hand, it is stipulated which communications module transmits what to which other communications module. That is to say, it is thus possible for data to be selected from transmission buffer stores 306, 307 and 308 and for data to be written to those buffer stores using so-called write select signals WRS or read select signals RDS. Thus, it is then possible, the interconnected communications modules, for data and/or messages to be transmitted via the second data path V very rapidly between all the communications modules. In particular, it is also possible for a message to be sent from one communications module to a plurality of other communications modules simultaneously. Furthermore, it is also possible for messages to be re-compiled from already existing messages and for those messages to be transmitted in a systematic manner. The control of this gateway function, that is to say, which message is to be passed from which bus to which other bus over the direct data path V, is effected by the gateway control unit 309 mentioned, that is, the gateway finite state machine, which is either constructed as an integral hardware state machine or runs as software, especially in the host, and accesses via the special registers mentioned, for example via communication request registers or communication mask registers, also included in blocks 306 to 308. In that manner, rapid data or message transmission and high flexibility, especially free configurability of the number of bus connections, and high flexibility in terms of the composition and structure of the gateway are advantageously possible.

In addition, a module in the form of a data integration unit DIU 500 is shown as an option. The latter is incorporated into data path V via input CIS (cascade input of the interface module) and an output COS (cascade output of that interface module). For that purpose, interface module 500, that is, the DIU, is connected via CIS to CON and via COS to C11 or to CI(n+1). It is thus possible for any desired number of communications modules and any desired number of such data integration units DIU 500 to be interconnected to form a gateway. They are then connected for that purpose, as shown, especially in a ring, from cascade output to cascade input in each case. CPU bus 313 is thus supplemented by a further connection 313a to the overall bus 403 in order to connect a further control unit, control unit 401 for data integration unit 500. Like control unit 309, that control unit 401 may be represented in the form of a finite state machine (FSM). That control unit 401, especially in the form of a finite state machine, may on the one hand be accommodated in data integration unit 500 itself or may be associated with it and located outside of it. In particular, in one embodiment, it may be included in the host station.

In a further embodiment, it is accommodated directly in a communications module, for example 301 or 305. The illustrated division between control unit 309 and control unit 401, though advantageous, is also not essential. Thus, control units 309 and 401 may be combined into one control unit, to which the above-mentioned considerations equally apply as regards its position/location. Using that data integration unit 500, therefore, further data, especially external data regarding the gateway, may be incorporated into transmission path V and thus transmitted to the communications modules.

The advantages and usage information mentioned with regard to transmission path V apply to all the communications modules combined in the gateway and to the data integration unit. On the basis of the considerations mentioned in the introduction, it is then necessary, however, for the time-triggered buses in particular, that is, their communications modules, to be automatically synchronized in order to avoid problems with regard to data consistencies of obsolete data, simultaneous interrupts, simultaneous handling of tasks etc. At the same time, as in the case of the cascade ring, that is, transmission path V, loading of the host processor for the purpose of the synchronization operation is to be avoided. For that purpose, trigger connection structure 600 is shown. Trigger outputs (Time Mark Interrupt Out) TMIO1 and TMIO2 of the relevant communications module are connected for that purpose to inputs of the respective other communications module, in this case based on TTCAN, as stop-watch inputs (Stop Watch Trigger In) SWTI1 and SWTI2, respectively, via connections 601 and 602, respectively. That connection may be in the form of a ring or equally in the form of a star structure. In particular, connections 601 and 602, being point-to-point connections, are advantageously in the form of serial bit lines, especially single-bit lines. That is to say, the synchronization of the time-triggered bus systems, in this case 320 and 321, is performed using the communications modules included in the gateway and associated with those bus systems, in this case 301 and 302, in which an additional synchronization arrangement or trigger line arrangement 600 is provided. That synchronization arrangement 600 then makes possible the synchronization of the time-triggered bus systems which is described below in FIG. 3.

FIG. 3 shows once again for that purpose communications modules 301 and 302, which are directly coupled via a connection 601. 320 and 321 again illustrate the at least two time-triggered bus systems, and TX31 and TX32 and RX31 and RX32 again illustrate the bidirectional coupling of the communications modules to the time-triggered bus systems. In a first communications module there is first trigger information TMI1 in block 202, by which a trigger signal is triggered in first bus system 320. This is done by the communications module itself, it being immaterial whether it is the time master in that bus system or is another station exercising the time master function. The first trigger information is obtained, for example, as a result of there being a time mark TM1 in a memory area 200, especially in a register. First time information CT1 formed by the cycle time of the first bus system reaches time mark TM1 thereby generating, on reaching it, time mark interrupt TMI1, that is, the first trigger information. The cycle time in the first bus system is set in dependence upon whether first communications module 301 is a time master or a slave. If it is a time master, the internal time of the communications module is already set to correspond to the global time of bus system 320 and thus is directly set as the cycle time. If communications module 301 is a slave, its internal time must first be corrected to the global time of the bus system in order for the correct cycle time to be obtained.

Figure 3:
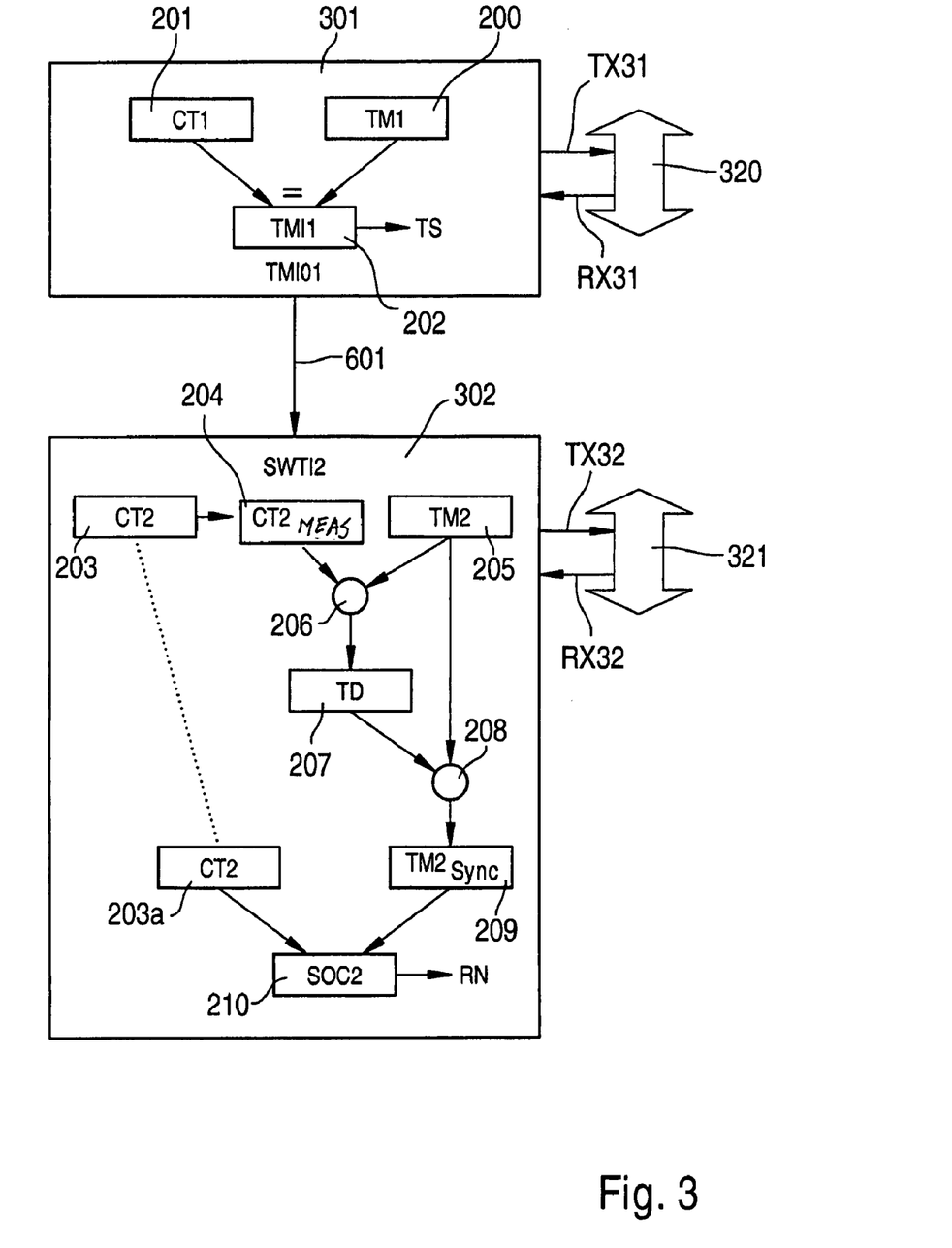
FIG. 3 is a block diagram illustrating the synchronization according to the present invention of two bus systems.

Once the first trigger information TMI1 is available, it is transmitted via connection 601 via output TMIO1 to input SWTI2 of communications module 302 and may, for example, be entered in a register there. The method is based, therefore, on a register value, that is, the time mark of the first bus system, Time Marked Bus 1 TM1 in the protocol controller, that is, in the communications module of the master network or master bus system, being specified and compared with the time base, that is, the cycle time of bus 1 CT1 of the communications module. If the two values are identical, the interrupt, that is, the time mark interrupt 1 TMI1, is triggered. As mentioned, the interrupt is then transmitted to the further protocol controller, that is, to communications module 302, of a bus system to be synchronized, at input SWTI2. That then triggers a measurement of the current point in time. For that purpose, there is also available in bus system 321, that is, the second bus system, a global time from which the cycle time may be derived. That time base, cycle time bus 2, is captured in dependence upon first trigger information TMI1, which gives the corresponding measured value CT2Meas, that is to say, the time information value, which is likewise entered in or transmitted to a register, in particular memory area 204 in this case. That time information value CT2Meas is then compared with a time mark of the second bus system, in particular formed by a further specified register value TM2, that time mark of bus 2, that is, TM2, corresponding to the expected point in time of the interrupt. That comparison is done by comparison device 206, especially by calculation of the difference. This then gives a time difference TD between CT2Meas and TM2 from memory area 205, in particular register 205. The time difference TD determined is entered, for example, in a memory area 207, in particular a register, and combined by combining device 208 with time mark TM2.

This may be done, on the one hand, by addition or by calculation of the difference, in particular according to the sign of the time difference TD. Combination by multiplication or division is also conceivable, however, by applying a time factor or a time quotient in order to obtain an adapted time mark for synchronization TM2Sync according to block 209. When time information CT2 then reaches that adapted time mark TM2Sync, which is obtained from time difference TD and the original time mark TM2, the next reference message in bus system 321, now synchronized with bus system 320, is triggered according to block 210 (SOC—Start of Cycle—triggering of a new communication cycle). Any desired point in time of a basic or matrix cycle may be used as a synchronization point.

That is to say, no synchronization of the networks and bus systems takes place by shifting the time trigger without inserting a time gap. For that purpose, a difference value TD, positive or negative, which corresponds to a measured or calculated deviation from the desired time trigger, is written into a register of the communications module of the bus system to be synchronized and the corresponding shift is activated, that is to say, a new SOC value SOC2 dependent upon an adapted time mark TM2Sync is triggered. The communications module then begins the next reference message when the cycle time, that is, the current time of the communication cycle, attains the combination, that is, in particular the sum of the time mark and the time difference, that is, the difference value. It is then possible either for all subsequent reference messages to be sent at the corresponding adapted time mark TM2Sync or for that procedure to occur only once and for the next reference messages to be sent with the usual time mark TM2 again. If the time lag between the two networks is too great for them to be synchronized with each other in one communication cycle and the insertion of a time gap is not possible owing to communication not taking place in that instance, it is also possible for a maximum value, in particular configured via a register, to be specified which acts as a limit for the time difference in both directions, lengthening and shortening of the communication cycle. Synchronization of the two networks then takes place in stages.

That is to say, therefore, the time difference TD determined is automatically combined in the next communication cycle with the corresponding time mark, in particular is preferably added (depending upon the sign and circumstances also subtracted) and the shifting is activated. The communications module then triggers the next reference message when the cycle time, CT2 in this case, corresponds especially to the sum of time mark TM2 and time difference TD, that is, to synchronization mark TM2Sync. If the communications module of the slave bus system is not the time master, the time difference is transmitted to the time master or also the new synchronization time mark TM2Sync is transmitted to the time master, which then corrects or adjusts the deviation at the beginning of the next communication cycle.

Figures 4A, 4C:
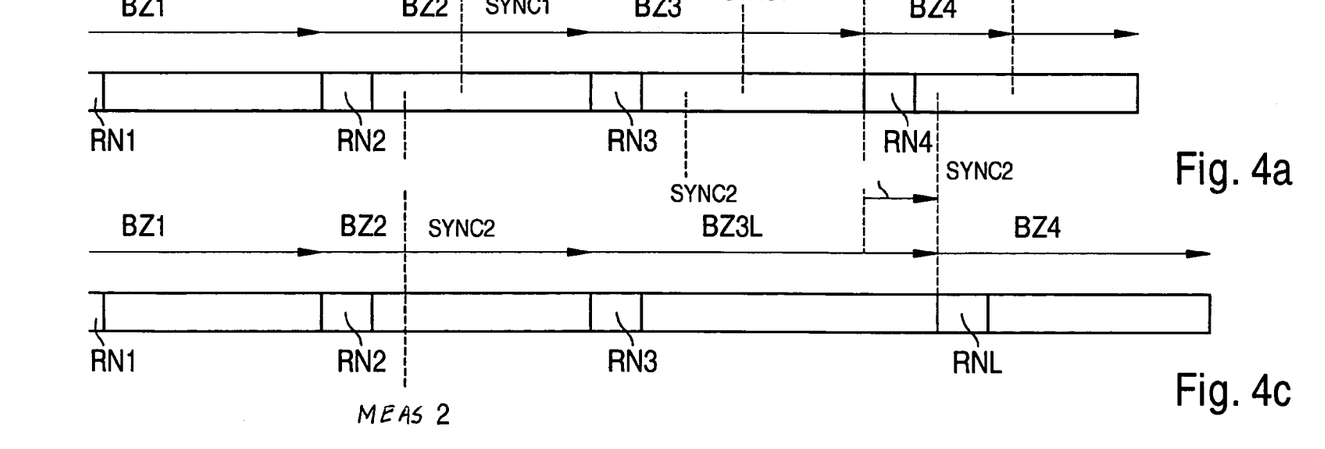
FIG. 4 shows a signal flow diagram with the reference messages and shifting thereof for synchronization of the bus systems.
Figure 4B:
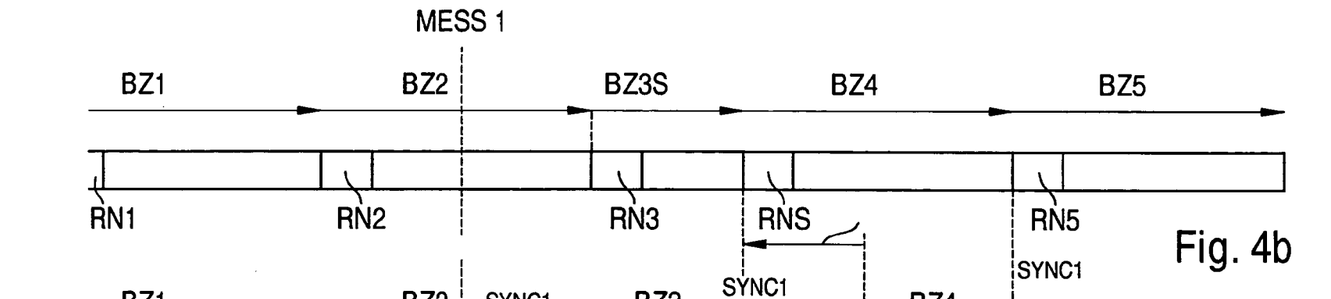

Referring to FIG. 4, which consists of FIGS. 4a, 4b and 4c, an example of a synchronization procedure will be explained once again. FIG. 4a shows for that purpose a sequence of 4 basic cycles, BZ1 to BZ4, initiated by the corresponding reference messages RN1 to RN4, these being transmitted repeatedly at a constant time interval. As a result, all the basic cycles BZ1, BZ2, BZ4 and especially BZ3 acquire the same length. In FIG. 4b, synchronization with the synchronization point SYNC1 of the first bus system of FIG. 4a takes place, as a result of which the basic cycle BZ3 becomes shorter. Basic cycles BZ1 and BZ2 have the original length triggered by reference messages RN1 and RN2. RN3, that is, the reference message of basic cycle 3, triggers the latter completely normally as specified. The next reference message RNS, however, is triggered by the relevant time mark, or the time mark value obtained from TD and TM2, that is, TM2Sync, which is ascertained in basic cycle 2 by triggering of the TM1 of the network of FIG. 4a at the synchronization mark SYNC/MEAS1 of the network of FIG. 4b and calculated in the communications module of the second network (similarly 4b) from measured and expected synchronization mark, and by the start-of-cycle information SOC which is based thereon, in such a manner that basic cycle 4 begins distinctly earlier. As a result, basic cycle 3 is shortened to BZ3S. The latter is then followed by basic cycle 4 and a normal basic cycle 5, triggered by a reference message RN5.

FIG. 4c once again illustrates the usual two first basic cycles BZ1 and BZ2, triggered by reference messages RN1 and RN2. RN3 also is started at an interval that is specifiable in time and in this case equidistant from RN1 and RN2. The following reference message RNL, however, is started later by the corresponding time mark, or the time mark value obtained from TD and TM2, that is, TM2Synch, owing to the later triggering of the start-of-cycle information SOC2, than shown in FIG. 4a. That is to say, basic cycle 4, BZ4, is triggered later and only by RNL. As a result, basic cycle 3 lengthens to BZ3L and the new basic cycle BZ4 is started later, as shown in FIG. 4c.

Simple automatic synchronization of two time-triggered bus systems, especially via a gateway, is possible in that manner.

If more than two bus systems or networks are to be synchronized with one another, one bus system will again represent the master bus system with which all the other bus systems or networks synchronize themselves. For synchronization, the first signal, that is, the first trigger information TMI1 of the master network, is then transmitted to the inputs SWT1 of all the other bus systems to be synchronized.

Synchronization is thus possible in both directions and may, with the use of a time master in the slave bus system, be carried out without invention of a host controller and independently of latencies. In a plurality of independent bus systems, an interrupt or a task may be triggered simultaneously, without a special message being sent. Synchronization of the networks takes place independently of the data rate and communication cycles used, on condition that the ratio of the communication cycles represents integral multiples of one another.

What is claimed is:

1. A device for synchronizing at least two bus systems, comprising:
   a first communications module for a first bus system; and
   a second communications module for a second bus system;
   wherein:
   in the first communications module, first trigger information is present by which a trigger signal is triggered in the first bus system; and
   the device is configured such that the first and second communications modules are connected to each other and the first trigger information is transmitted to the second communications module, and the second communications module is configured such that a time information value is determined from the first trigger information and the time information value is compared with a second time mark of the second bus system to determine a time difference and a next reference message being triggered in the second bus system in dependence upon the second time mark and the time difference.

2. The device according to claim 1, wherein the first communications module corresponds to at least one of (a) a time master, (b) a potential time master and (b) a slave of the first bus system and is configured such that it transmits a trigger signal repeatedly at a specifiable time interval, triggered by the first trigger information when first time information reaches a first time mark associated with the first trigger information.

3. The device according to claim 1, wherein a first memory area is provided in the second communications module, in which the second time information value is stored.

4. The device according to claim 1, wherein a second memory area is provided, in which the second time mark is stored.

5. The device according to claim 1, wherein a third memory area is provided, in which the time difference is stored.

6. The device according to claim 1, wherein the second communications module corresponds to a time master of the second bus system and is configured such that it triggers the next reference message in the second bus system when second time information attains the sum of the second time mark and the time difference.

7. The device according to claim 1, wherein the second communications module corresponds to a slave in the second bus system and is configured, such that second trigger information is transmitted to a third communications module, which is a time master in the second bus system, when second time information attains the sum of the second time mark and the time difference.

8. The device according to claim 1, wherein the first and second communications modules are connected to each other via a direct connection path such that the first trigger information is written directly into a register of the second communications module.

9. The device according to claim 3, wherein the memory area is in the form of a register.

10. The device according to claim 7, wherein the direct connection path is in the form of a point-to-point connection.

11. The device according to claim 7, wherein the direct connection path is in the form of a serial bit line.

12. An arrangement, comprising:
    at least two bus systems; and
    a device for synchronizing the at least two bus systems having a first communications module on a first bus system and a second communications module on a second bus system;
    wherein in the first communications module, first trigger information is present by which a trigger signal is triggered in the first bus system, the first and second communications modules are connected to each other such that the first trigger information is transmitted to the second communications module, and the second communications module is configured such that a time information value is determined from the first trigger information and that time information value is compared with a second time mark of the second bus system to determine a time difference and a next reference message being triggered in the second bus system in dependence upon the second time mark and the time difference.

13. A method for synchronizing at least two bus systems, comprising:
    triggering, in a first bus system, a trigger signal by first trigger information;
    transmitting the first trigger information to the second bus system;
    determining a time information value from the first trigger information;

comprising the time information value with a second time mark of the second bus system;
determining a time difference; and
triggering a next reference message in the second bus system in dependence upon the second time mark and the time difference.

14. The method according to claim 13, wherein the trigger signal in the first bus system is transmitted repeatedly at a specifiable time interval, triggered by the first trigger information when first time information reaches a first time mark associated with the first trigger information.

15. The method according to claim 13, wherein the next reference message of the second bus system is triggered by second trigger information when second time information attains the sum of the second time mark and the time difference.

* * * * *